United States Patent
Koved et al.

(10) Patent No.: US 7,810,135 B2
(45) Date of Patent: *Oct. 5, 2010

(54) APPARATUS FOR ADOPTING AUTHORIZATIONS

(75) Inventors: Lawrence Koved, Pleasantville, NY (US); Anthony Joseph Nadalin, Austin, TX (US); Marco Pistoia, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 318 days.

This patent is subject to a terminal disclaimer.

(21) Appl. No.: 11/968,673

(22) Filed: Jan. 3, 2008

(65) Prior Publication Data

US 2008/0104698 A1 May 1, 2008

Related U.S. Application Data

(63) Continuation of application No. 10/639,862, filed on Aug. 13, 2003, now Pat. No. 7,343,620.

(51) Int. Cl.
 *H04L 9/00* (2006.01)
(52) U.S. Cl. .......................... 726/2; 713/167
(58) Field of Classification Search ................ 726/2, 726/21; 713/167
See application file for complete search history.

(56) References Cited

U.S. PATENT DOCUMENTS

| | | | |
|---|---|---|---|
| 5,974,549 A * | 10/1999 | Golan | ............................ 726/23 |
| 6,047,377 A | 4/2000 | Gong | |
| 6,901,586 B1 * | 5/2005 | Czajkowski | .................. 717/151 |
| 6,910,209 B2 * | 6/2005 | Kawahara et al. | ............ 718/102 |
| 6,931,544 B1 * | 8/2005 | Kienhofer et al. | ............ 717/118 |
| 7,047,369 B1 * | 5/2006 | Gruper et al. | ................ 711/152 |
| 2002/0174224 A1 * | 11/2002 | Scheifler et al. | .............. 709/225 |
| 2003/0110467 A1 * | 6/2003 | Balakrishnan | ............... 717/104 |

OTHER PUBLICATIONS

Designing JAVASEAL How to Make JAVA Safe for Agents by Jan Vitek, Ciaran Bryce & Walter Binder, Jul. 1998.*

* cited by examiner

*Primary Examiner*—Ellen Tran
(74) *Attorney, Agent, or Firm*—Yee & Associates, P.C.; Jeffrey S. LaBaw

(57) ABSTRACT

A method and apparatus for implementing a new Permission for methods that perform callback operations are provided. The method and apparatus provide an AdoptPermission Permission type that allows a method to pass a Java 2 authorization test without having the specific required Permissions expressly granted to the method and without the method having the AllPermission Permission granted to it. With the apparatus and method, an AdoptPermission Permission type is defined that operates to allow a ProtectionDomain to "adopt" a required Permission. However, this adoption of a required Permission can only be performed if the Protection-Domain of at least one method in the thread stack has been granted a Permission that implies the required Permission. Thus, the AdoptPermission Permission type provides an intermediate mechanism that is not as over-inclusive as the AllPermission Permission type and is not as under-inclusive as requiring that all methods in the thread stack include the required Permission expressly granted to them.

13 Claims, 5 Drawing Sheets

APPARATUS FOR ADOPTING AUTHORIZATIONS

This application is a continuation of application Ser. No. 10/639,862, filed Aug. 13, 2003 now U.S. Pat. No. 7,343,620, status i.e., allowed.

BACKGROUND OF THE INVENTION

1. Technical Field

The present invention is directed to an improved data processing system and, in particular, an improved mechanism providing a new Permission for methods that perform callback operations.

2. Description of Related Art

In Java Development Kit (JDK) version 1.1, local applications and remote programs signed by a trusted entity were generally granted full access to vital system resources, such as the file system. Unsigned remote programs, or remote programs signed by untrusted entities, could access only limited resources. A SecurityManager was responsible for determining which resource accesses were allowed.

In the Java 2 Software Development Kit (SDK), the security architecture is policy-based and allows for fine-grained access control. In Java 2 SDK, when code is loaded by the ClassLoader, it is assigned to a ProtectionDomain that contains a collection of Permissions based on the security policy currently in effect. Each Permission specifies a permitted access to a particular resource, such as "read" and "write" access to a specified file or directory, or "connect" access to a given host and port. The security policy specifying which Permissions are available for code from various signers and/or locations can be initialized from an external configurable policy file. Unless a Permission is explicitly granted to code, that code cannot access the resource that is protected by that Permission. These concepts of Permission and policy enable the Java 2 SDK to offer fine-grained, highly configurable, flexible, and extensible access control. Such access control can be specified for all Java code including but not limited to applications, applets, Java beans, and servlets.

The Java 2 security architecture imposes the constraint that whenever access to a protected resource is attempted, each class in the execution stack is checked for the required Permission to access that resource. This Permission checking is performed by the method java.security.AccessController.checkPermission( ). The security policy would be ineffective if code with no Permissions were able to invoke code with more Permissions and by doing so, access protected resources that it should not access by virtue of its own ProtectionDomain.

It can be seen that with large programs having many methods and classes, it may be very cumbersome to identify all of the Permissions that are being used and to which classes the Permissions should be granted. The Java 2 security architecture does provide some mechanisms for granting Permissions without having to explicitly grant each and every Permission that would be necessary to ensure that a piece of code can work with all protected resources.

For example, Java 2 SDK provides the AllPermission Permission type that provides a means by which all Permissions are granted to a class. In practice, AllPermission grants code the ability to run with security disabled. The security problems associated with using such a Permission indiscriminately are apparent. This Permission is intended be used only during testing, or in extremely rare cases where a program or library is completely trusted, and adding the necessary Permissions to the policy is prohibitively cumbersome.

Another tool provided through the Java 2 SDK is the AccessController.doPrivileged( ) method. Calling this method allows for the checking of Permissions to access a protected resource to be halted at the method that calls doPrivileged( ). In this way, the method calls higher in the thread stack than the method calling doPrivileged( ) are implicitly granted the requisite Permissions to access the protected resource. This method call is intended to be used in situations where forcing the requirement that all method calls in the thread stack have the expressly granted Permission to access the protected resource is impractical or undesirable, such as with client code that calls Application Program Interface (API) code.

A problem arises with the checking of Permissions when a "callback" in the code is encountered. For example, assume that there are two classes "A" and "B". Further, there is a method in "A" called "M1", and a method in "B" called "M2". If "M2" obtains a reference to an instance of "A" (for example, through a method parameter, a return value from a method invocation, or a field), and calls M1 on that instance, then the location where this call occurs is called a callback.

If the Java 2 authorization system, implemented by AccessController.checkPermission( ), is called as a result of M2 calling M1, a problem arises because all of the active methods in the current thread, including M2, need to be authorized for the privileged operation. If M1 or any of the methods subsequently called and appearing in the thread stack do not make a call to AccessController.doPrivileged( ), then class "B" will be required to be authorized for the privileged operation, which means that it will have to have the required Permission specifically granted to it.

The most common case where this occurs is in general-purpose library code as is found in the Java runtime, which can be called by any client code. In particular, the client code calling library code can pass parameters to the library code methods. These same parameters can then be used by the library code as receivers for method invocations. In general, the behavior of each of those client code methods is a priori unknown (unless the declared type of the parameter is final, which means that it cannot be overwritten) because it depends on the client code implementation. As a result, it is not possible to know a priori which Permissions will be needed by the parameters passed to the library code.

The current solution is to give class "B" in the library the Java 2 AllPermission Permission, which is equivalent to the Permission to perform any Java 2 privileged operation, so that when a callback occurs, all methods in "B" will be authorized. In this way, when Java 2 authorization calls are made as a result of a callback, the authorization will succeed. However, one of the effects of allocating AllPermission to class "B" is that it may result in a security hole because class "B" becomes over privileged, violating the "Principle of Least Privilege".

Thus, it would be beneficial to have an apparatus and method for implementing a new Permission type that allows for callback methods to be authorized using the Java 2 authorization system while not over privileging other code and thereby creating security holes.

SUMMARY OF THE INVENTION

The present invention provides a method and apparatus for implementing a new Permission for methods that perform callback operations. The present invention provides an AdoptPermission Permission type that allows a method to pass a Java 2 authorization test without having the specific required Permissions expressly granted to the method and without the method having the AllPermission Permission granted to it.

With the apparatus and method of the present invention, an AdoptPermission Permission type is defined that operates to allow a ProtectionDomain to "adopt" a required Permission. However, this adoption of a required Permission can only be performed if a ProtectionDomain of at least one method in the thread stack implies the required Permission. Thus, the AdoptPermission Permission type provides an intermediate mechanism that is not as over-inclusive as the AllPermission Permission type and is not as under-inclusive as requiring that all methods in the thread stack have the required Permission expressly granted to them.

When the Java 2 authorization system, implemented by the AccessController.checkPermission( ) method, is invoked to check the Permissions of the methods in a thread stack, a java.security.AccessControlContext for the current thread is created. The list of ProtectionDomains is clipped at the stack frame preceding an AccessController.doPrivileged( ) stack frame. Thus, any method calls occurring prior to the method calling AccessController.doPrivileged( ) are not checked by the Java 2 authorization system. Any duplicate ProtectionDomains in the AccessControlContext are removed and an ordered set of ProtectionDomains is obtained.

Since the Permissions granted to a thread of execution are obtained by intersecting the Permissions granted to all the ProtectionDomains in the thread's AccessControlContext, an AccessControlContext with fewer ProtectionDomains is potentially more privileged. Therefore, a parent thread could gain additional privileges by just creating a child thread, which would have fewer ProtectionDomains in its AccessControlContext. To prevent this from happening, the Java 2 authorization system forces a child thread to inherit its parent's AccessControlContext. If the child thread does not contain a call to AccessController.doPrivileged( ), the inherited AccessControlContext is merged with the current AccessControlContext to create a merged and ordered ProtectionDomain set where the inherited AccessControlContext's ProtectionDomains are first in the ordered set.

For each ProtectionDomain in the AccessControlContext, the implies( ) method is run to determine if the ProtectionDomain implies the required Permission. If any ProtectionDomain is determined to not imply the required Permission, a check is performed to see if the ProtectionDomain contains the AdoptPermission Permission. If so, the authorization requested is passed even though the ProtectionDomain does not imply the required Permission. Thus, the ProtectionDomain "adopts" the required Permission. However, if the first ProtectionDomain in the stack is reached and none of the ProtectionDomains imply the required Permission, but all of the ProtectionDomains have only been granted the AdoptPermission, then the authorization test is considered failed and a SecurityException is thrown.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a mechanism by which a new Permission is employed to allow methods in a class that perform callback operations to be authorized for accessing a privileged resource without requiring AllPermission. As a result the security holes that might have been created by granting AllPermission are avoided.

The preferred embodiments of the present invention will be described with regard to the Java 2 SDK. However, the present invention is not limited to use with the Java 2 SDK. Rather, the present invention may be used with any environment in which security policies are utilized to protect access to computer system resources. Thus, the references to Java 2 SDK and elements of this programming environment are only intended to be exemplary and are not intended to imply any limitation on the present invention.

Since the present invention operates in a Java security environment, a brief description of the Java computing environment will be provided. As is well known, Java is typically used in a client/server or other distributed data processing environment, although Java may also be used on a single computing device as well. As such, the following description of the Java computing environment will assume a client/server environment although the present invention may also be used by a single computing device with or without a network connection.

Figure 1:
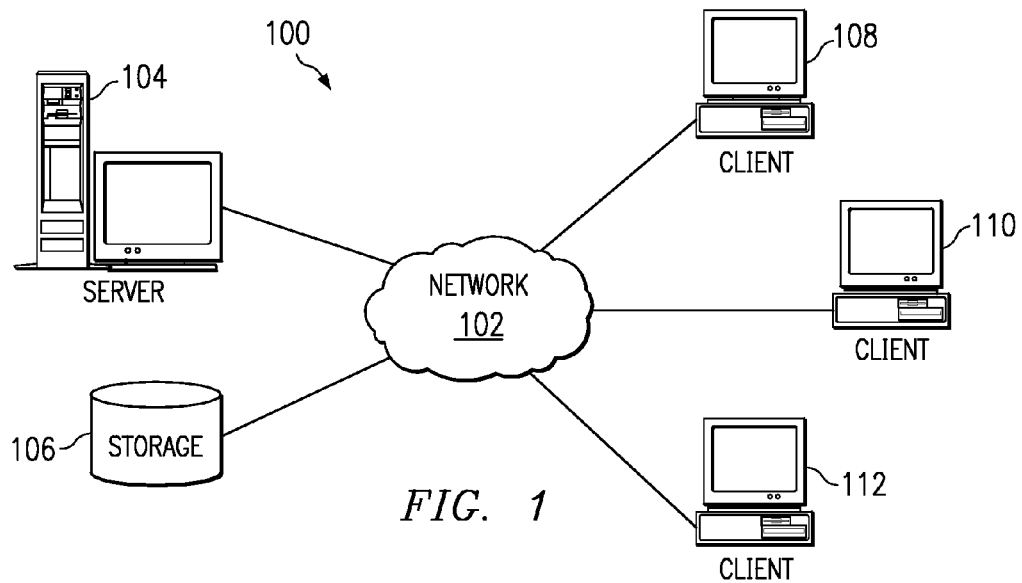
FIG. 1 is an exemplary diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
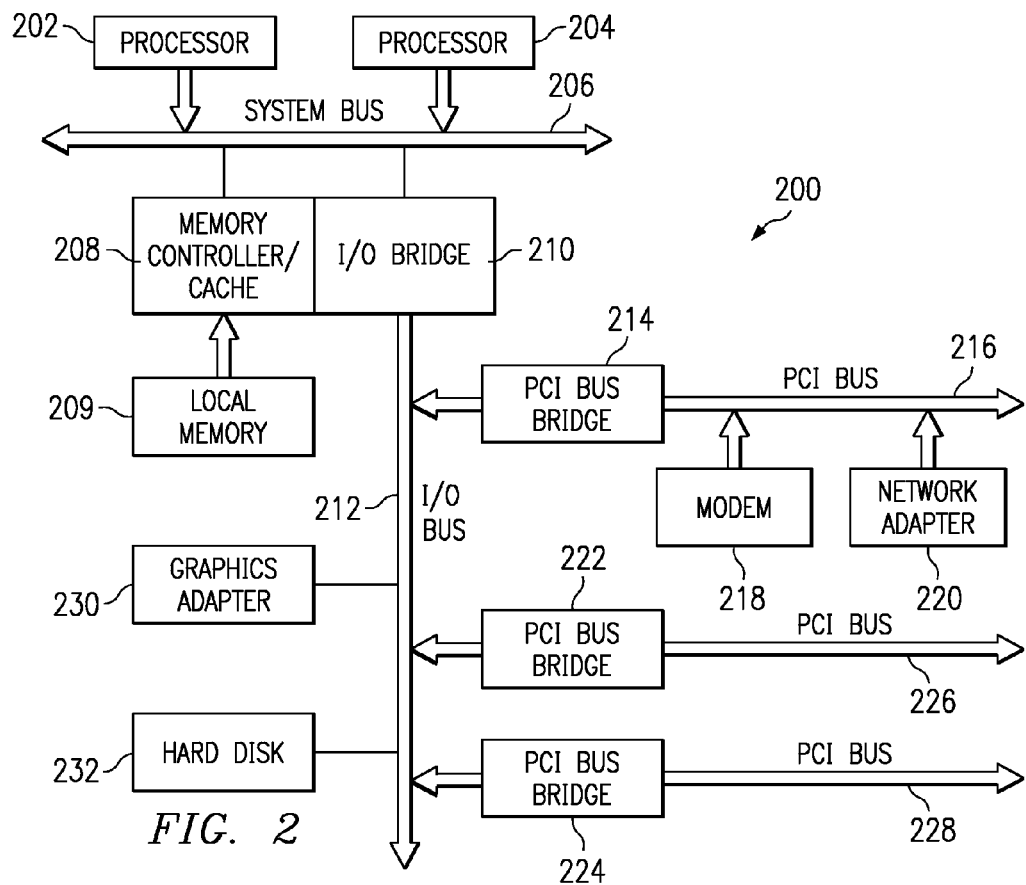
FIG. 2 is an exemplary diagram of a server computing system according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. Input/Output (I/O) bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
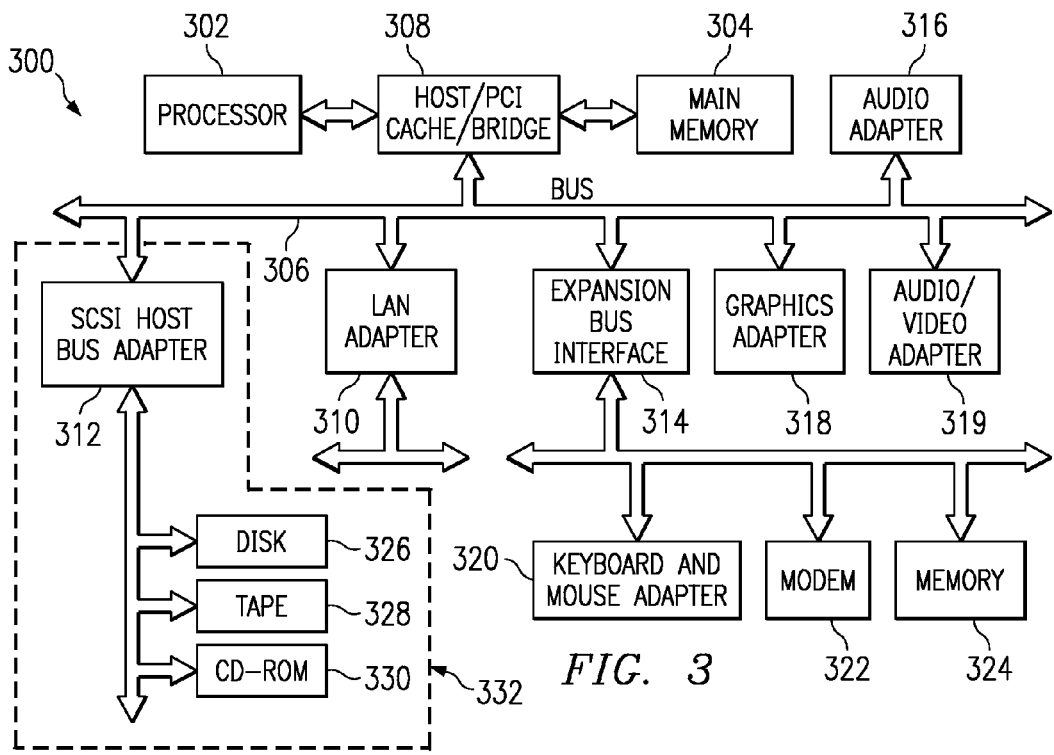
FIG. 3 is an exemplary diagram of a client computing system according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and Compact Disk-Read Only Memory (CD-ROM) drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object-oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash Read Only Memory (ROM) (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
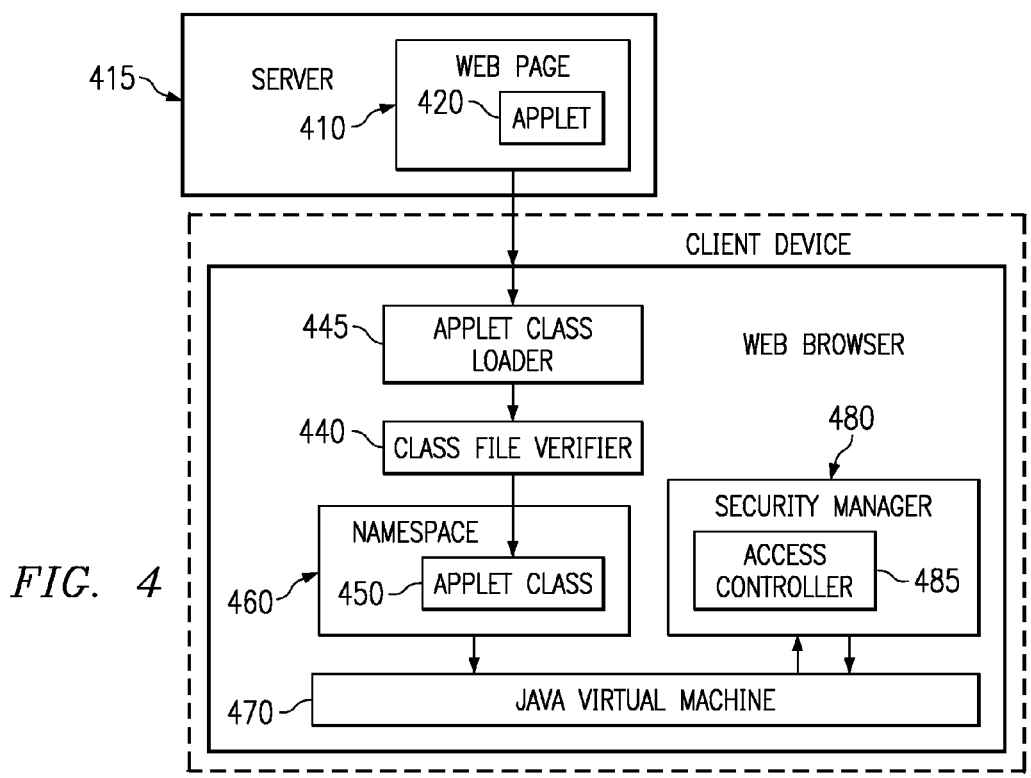
FIG. 4 is an exemplary diagram illustrating a Java Virtual Machine.

FIG. 4 shows how a Java applet is handled using a Java Virtual Machine (JVM) that implements the Java 2 SDK security architecture. As shown in FIG. 4, a Web page 410 may include a hyperlink, or the like, to a Java applet 420. When a user of the Web browser 430 selects the hyperlink, or otherwise initiates the download of the applet 420, the applet code is fetched from the server 415 associated with the applet 420. This operation is performed by a ClassLoader 445, which is also responsible for instantiating the applet as a class or set of classes 450. The ClassLoader 445 then assigns the applet class or set of classes 450 to a namespace 460. Before the fetched code can be executed, it is verified by the Class File Verifier 440.

At the time the classes 450 of the applet are instantiated, the JVM 470 also builds a ProtectionDomain for the applet 420 classes 450. A ProtectionDomain is a data structure in which a set of java.security.PermissionCollection objects is present. A PermissionCollection is a grouping of Permissions assigned to the code by the current security policy. Every time a developer defines a new Permission, the developer must also define a PermissionCollection to which the new Permission belongs or assume the default implementation. These PermissionCollections are assigned to classes 450 of the applet 420. Thus, when the classes are instantiated, the JVM looks at the PermissionCollections assigned to the classes and generates a ProtectionDomain based on the assigned PermissionCollections.

The bytecode is then executed by the JVM 470. The bytecode is executed as threads of execution. A thread is a stream of execution. Threads allow multiple streams of execution to occur virtually simultaneously in a data processing system thereby allowing multitasking. An executing thread has a thread stack. The thread stack is a mechanism for tracking which method calls which other method in order to be able to return to the appropriate program location when an invoked method has finished its work.

During execution, the applet 420 bytecode may make calls that attempt to access a protected resource, such as the file system, network, etc. When such a call is made by the applet's thread of execution, the underlying API calls a SecurityManager.checkPermission( ) method or another "check" method (e.g., SecurityManager.checkRead( ) or SecurityManager.checkConnect( )), based on the type of resource being accessed. This results in a call to AccessController.checkPermission( ), a method of the AccessController class 485.

The SecurityManager 480 is the part of a JVM that enforces the security policy of the computing system on which the JVM is resident. When an untrusted operation is to be performed by an application, the SecurityManager 480 is responsible for checking whether the application has the appropriate Permission for performing the operation. To accomplish this, the SecurityManager's default implementation relies on the AccessController.checkPermission( ) method.

A Permission represents the right to access a resource. In order for a resource access to be allowed, the corresponding Permission must be explicitly granted to the code attempting the access. A Permission may have a target and, in some cases, a comma-separated list of one or more actions. For example, the following code creates a java.io.FilePermission object representing read access to the file named abc in the /tmp directory:

perm=new java.io.FilePermission("/tmp/abc", "read");

In this Permission, the target name is "/tmp/abc" and the action string is "read".

It is important to note that the above statement creates a Permission object that represents, but does not grant access to, a system resource. Permission objects are constructed and assigned, or granted, to code based on the policy in effect. When a Permission object is assigned to some code, that code is granted the Permission to access the system resource specified in the current SecurityManager when making access decisions. In this case, the (target) Permission object is created based on the requested access, and checked against the Permission objects granted to and held by the code making the request.

The security policy for an application environment is represented by a java.security.Policy object. In the Java 2 reference implementation, the policy is file-based and can be specified within one or more policy configuration files. The policy file(s) specify what Permissions are allowed for code from specified code sources. A sample policy file entry granting code from the /home/sysadmin directory read access to the file /tmp/abc is:

```
grant codeBase "file:/home/sysadmin/" {
    Permission java.io.FilePermission "/tmp/abc",
"read";
};
```

In the Java Development Kit 1.1, it was the responsibility of the SecurityManager to directly call a check method on untrusted resource access requests in order to determine if the resource access request should be granted. In Java 2 SDK, the default SecurityManager implementation relies on the AccessController class 485 by calling the AccessController.checkPermission( ) method and passing it the relevant Permission object.

When the AccessController.checkPermission( ) method is called by the SecurityManager 480 with a Permission object as a parameter, the AccessController 485 retrieves the AccessControlContext for a thread of execution that resulted in the call of the AccessController.checkPermission( ) method. The AccessControlContext encapsulates an array of ProtectionDomains for the classes in the thread stack. Each class is mapped to its code source, represented as a java.security.CodeSource object. A CodeSource is a combination of an origination location of a resource access request and a set of zero or more digital certificates, which are the certificates of the entities who signed the code attempting to perform the resource access.

Having retrieved the AccessControlContext, the AccessController 485 calls an AccessControlContext.checkPermission( ) method on the AccessControlContext. The AccessControlContext.checkPermission( ) method calls the implies( ) method on each ProtectionDomain identified in the AccessControlContext to determine if the particular Permission being checked is implied by each of the ProtectionDomain objects. This causes an implies( ) method to be called on the appropriate PermissionCollection in each of the ProtectionDomains. Depending on the PermissionCollection's implementation, this typically causes an implies( ) method to be called on each Permission in the PermissionCollection. In this way, each ProtectionDomain identified in the AccessControlContext is checked to see if it implies to the Permission being checked.

If the results of this check indicate that any one of the ProtectionDomains does not imply the requisite Permission, which is the Permission being checked, then the requested resource access is denied. Thus, all ProtectionDomains identified by the AccessControlContext must imply the Permission being checked in order for the access request to be granted. This enforces the requirement that each ProtectionDomain include at least one PermissionCollection that implies the Permission being checked.

Thus, in known systems, a developer of an application must possess a sufficient amount of knowledge about the security policy and Permissions of a particular computing system in order to make sure that the new application may work with the existing system and system resources. The present invention allows for a developer to grant Permissions to classes without having to have a detailed knowledge of the security structure of the computing system but also without creating the security holes present with the use of the AllPermission Permission type.

In a preferred embodiment of the present invention, when the Java 2 authorization system, implemented by the AccessController.checkPermission( ) method call, is invoked to check the Permissions of methods in a thread stack, a determination is made as to whether at least one of the method calls in the thread stack has the associated ProtectionDomain that implies the required Permission for accessing the protected resource. If none of the methods in the thread stack have the associated ProtectionDomain implying the required Permission, the access attempt is denied and a SecurityException is thrown.

If at least one of the methods in the thread stack has the required Permission in its ProtectionDomain, then the other ProtectionDomains for the other methods may have the new AdoptPermission Permission type in their ProtectionDomains and thereby, do not need to have the required Permission in their ProtectionDomains. In this way, those method calls that do not have the required Permission in their ProtectionDomains, but have the AdoptPermission, "adopt" the Permission from the method call that has the required Permission in its ProtectionDomain. As a result, the security check to determine if each method call in the thread stack is assigned the requisite Permission will succeed.

Thus, with the present invention, only the required Permission is adopted by use of the mechanisms of the present invention. With the AllPermission Permission type, known in the art, all Permissions are granted to the associated method call—even those that are not required to access the protected resource. As a result, the method call is provided with Permissions that it should not be granted and thus, a security hole is created. The present invention eliminates this potential breach of security.

A detailed explanation of a preferred exemplary embodiment will now be provided. With this preferred embodiment of the present invention, when the AccessController.checkPermission( ) method is called, an AccessControlContext for the current thread is created. The list of ProtectionDomains is clipped at the stack frame preceding an AccessController.doPrivileged( ) stack frame, if any. If there are more than one AccessController.doPrivileged( ) calls on the stack, then the list of ProtectionDomains is clipped at the stack frame preceding the AccessController.doPrivileged( ) call closest to the AccessController.checkPermission( ) stack frame. Thus, any method calls occurring prior to the method calling AccessController.doPrivileged( ) are not checked by the Java 2 authorization system. Any duplicate ProtectionDomains in the AccessControlContext are removed and an ordered set of ProtectionDomains is obtained.

If there is an inherited AccessControlContext from a parent thread, and the current thread does not contain a call to AccessController.doPrivileged( ), the inherited AccessControlContext is merged with the current AccessControlContext to create a merged and ordered ProtectionDomain set where the inherited AccessControlContext's ProtectionDomains are first in the ordered set. This is done to prevent any thread to become over privileged by simply creating a more privileged child thread acting on the parent's behalf. Notice that AdoptPermission typically is intended for library code, though it is no limited to that purpose.

For each ProtectionDomain in the AccessControlContext, the implies( ) method is run to determine if the ProtectionDomain implies the required Permission. If any ProtectionDomain is determined to not imply the required Permission, a check is performed to see if the ProtectionDomain contains the AdoptPermission Permission. If so, the authorization requested is passed even though the ProtectionDomain does not explicitly imply the required Permission. Thus, the ProtectionDomain "adopts" the required Permission. The authorization test succeeds if at least one of the ProtectionDomains in the AccessControlContext explicitly implies the required Permission, while all the other ProtectionDomains either explicitly imply the required Permission or are granted an AdoptPermission.

Figure 5:
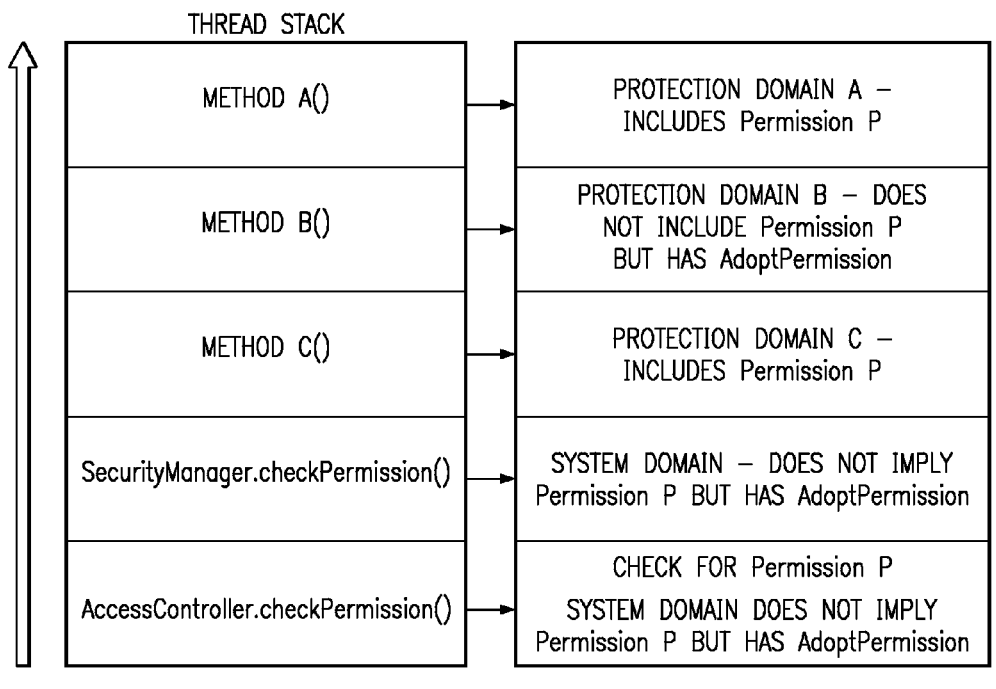
FIG. 5 is an exemplary diagram illustrating the use of an AdoptPermission Permission type according to the present invention.

FIG. 5 illustrates an exemplary operation of the present invention with a thread stack in which the AdoptPermission Permission type is included in one or more of the ProtectionDomains of the methods in the thread stack. With the present invention, the method AccessControlContext.CheckPermission( ) is modified such that, after calling implies( ) on a ProtectionDomain with a particular Permission object as a parameter, if implies( ) returns a result of "false," the AccessControlContext.CheckPermission( ) method verifies that the ProtectionDomain contains AdoptPermission. If the ProtectionDomain does not include AdoptPermission, i.e. this second check returns a result of "false," then the authorization test fails and a SecurityException is thrown. If either of the two tests returns a result of "true," then the AccessControlContext.CheckPermission( ) method runs the same tests on the next ProtectionDomain in the stack. The overall authorization test succeeds if all the ProtectionDomains in the AccessControlContext imply the necessary permission or at least contain the AdoptPermission. However, at least one of the ProtectionDomain must explicitly imply the required Permission. An example of this Permission check is provided in FIG. 5.

As shown in FIG. 5, methods are called in a top down order such that method A calls method B, method B calls method C, method C calls SecurityManager.checkPermission( ), which then calls AccessController.checkPermission( ). The AccessController.checkPermission( ) method performs a security check by calling the implies( ) method on the ProtectionDomains of methods C( ), B( ), and A( ) in that order going from bottom to top of the thread stack.

As indicated in FIG. 5, the result of the authorization checks performed by the AccessController.checkPermission( ) method call are (1) method C is checked and its associated ProtectionDomain includes the required Permission P, thus it passes the authorization check; (2) method B's associated ProtectionDomain does not include the Permission P but it has been granted the AdoptPermission Permission type of the present invention. As a result, the authorization check passes; (3) method A's associated ProtectionDomain includes the required Permission P and thus, it passes the authorization check as well; (4) access to the protected resource is granted because each of the methods pass the authorization check. Notice that SecurityManager and AccessController both belong to the system domain. In a traditional Java 2 environment, system classes are implicitly granted AllPermission. With the AdoptPermission Permission type defined by the current invention, it is not necessary for system classes to be granted AllPermission. They may be granted an AdoptPermission as is needed. If the class does not require any Permissions, it no longer needs to have AllPermission, nor AdoptPermission. If a class does not explicitly need Permissions, but is known to be on the call stack when an authorization test is performed, it can now have AdoptPermission instead of AllPermission.

If the thread stack shown in FIG. 5 were to include a call to the AccessController.doPrivileged( ) method call, the AccessController.checkPermission( ) authorization checks would stop at the method calling doPrivileged( ) since it is assumed that all method calls higher up in the stack are temporarily exempted from the Permission requirement. In the event that a doPrivileged( ) method call is not present in the thread stack, the present invention allows methods with an AdoptPermission to be granted the required Permission as long as another ProtectionDomain for a method in the thread stack has the required Permission. As a result, a method may be granted a required Permission without knowing what that Permission is a priori and without having to grant all AllPermission to the method as in the prior art use of the AllPermission Permission type.

Figure 6:
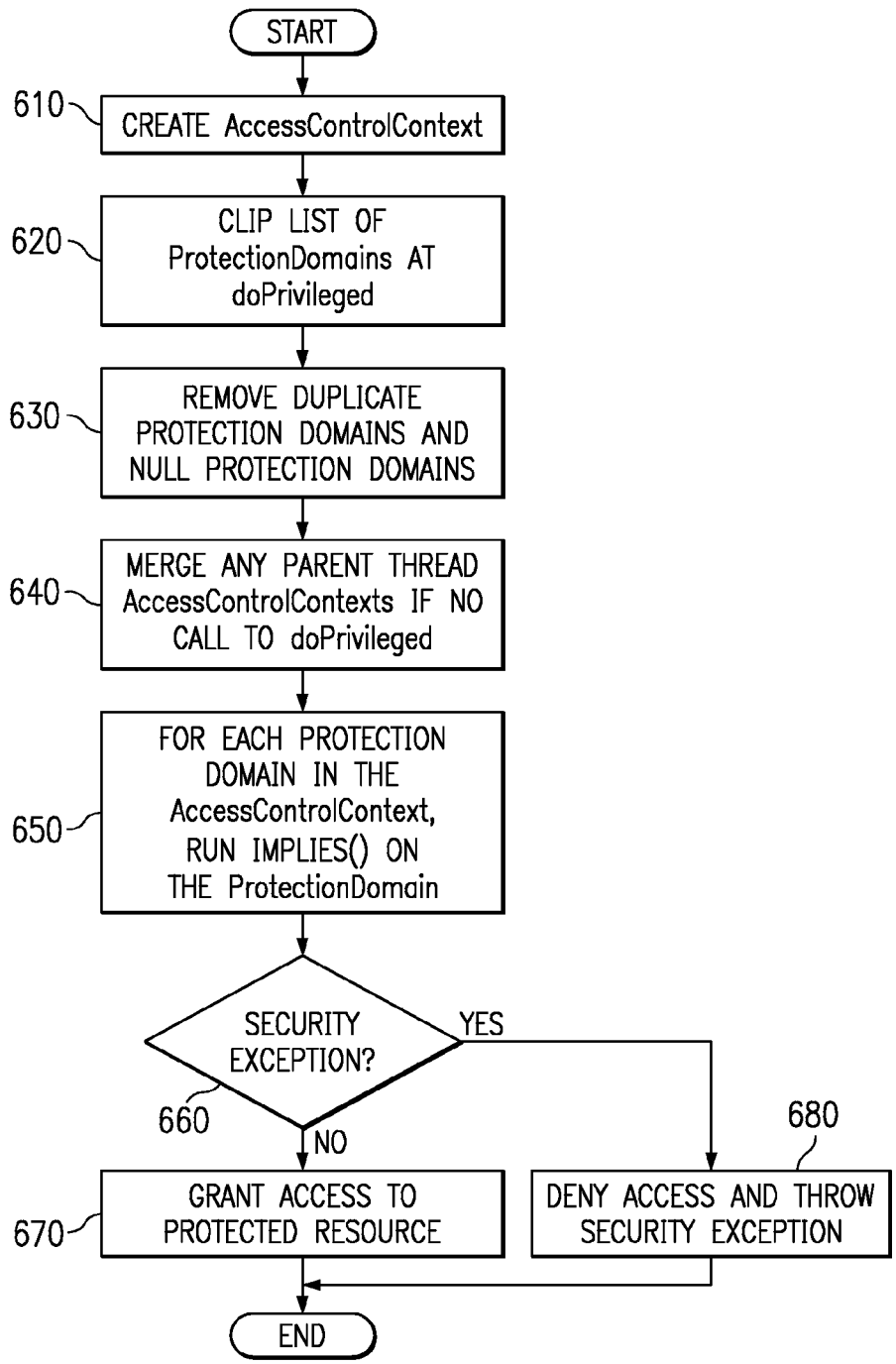
FIG. 6 is a flowchart outlining an exemplary operation of the Java 2 authorization algorithm.

FIG. 6 is a flowchart outlining a prior art authorization mechanism. FIG. 6 will be contrasted with FIG. 7 which provides a flowchart of the operation of the present invention.

As shown in FIG. 6, the operation starts with the creation of an AccessControlContext for the thread (step 610). The list of ProtectionDomains in the AccessControlContext is clipped at the stack frame preceding a call to doPrivileged( ) if any (step 620). Any duplicate ProtectionDomains in the list of ProtectionDomains for the AccessControlContext, or the null ProtectionDomain, which corresponds to the system domain, are removed from the list of ProtectionDomians for the AccessControlContext (step 630). Any parent thread AccessControlContexts are then merged with the current AccessControlContext so long as there is not a call to doPrivileged( ) in the present thread (step 640).

Then, for each ProtectionDomain in the AccessControlContext, the implies( ) method is run on the ProtectionDomain to see if the ProtectionDomain implies the required Permission (step 650). If one or more of the ProtectionDomains do not implies the required Permission, a SecurityException is to be thrown. The determination as to whether a SecurityException is to be thrown is made (step 660) and if so, access to the protected resource is denied and the SecurityException is thrown (step 680). Otherwise, access to the protected resource is granted (step 670) and the operation ends.

Figure 7:
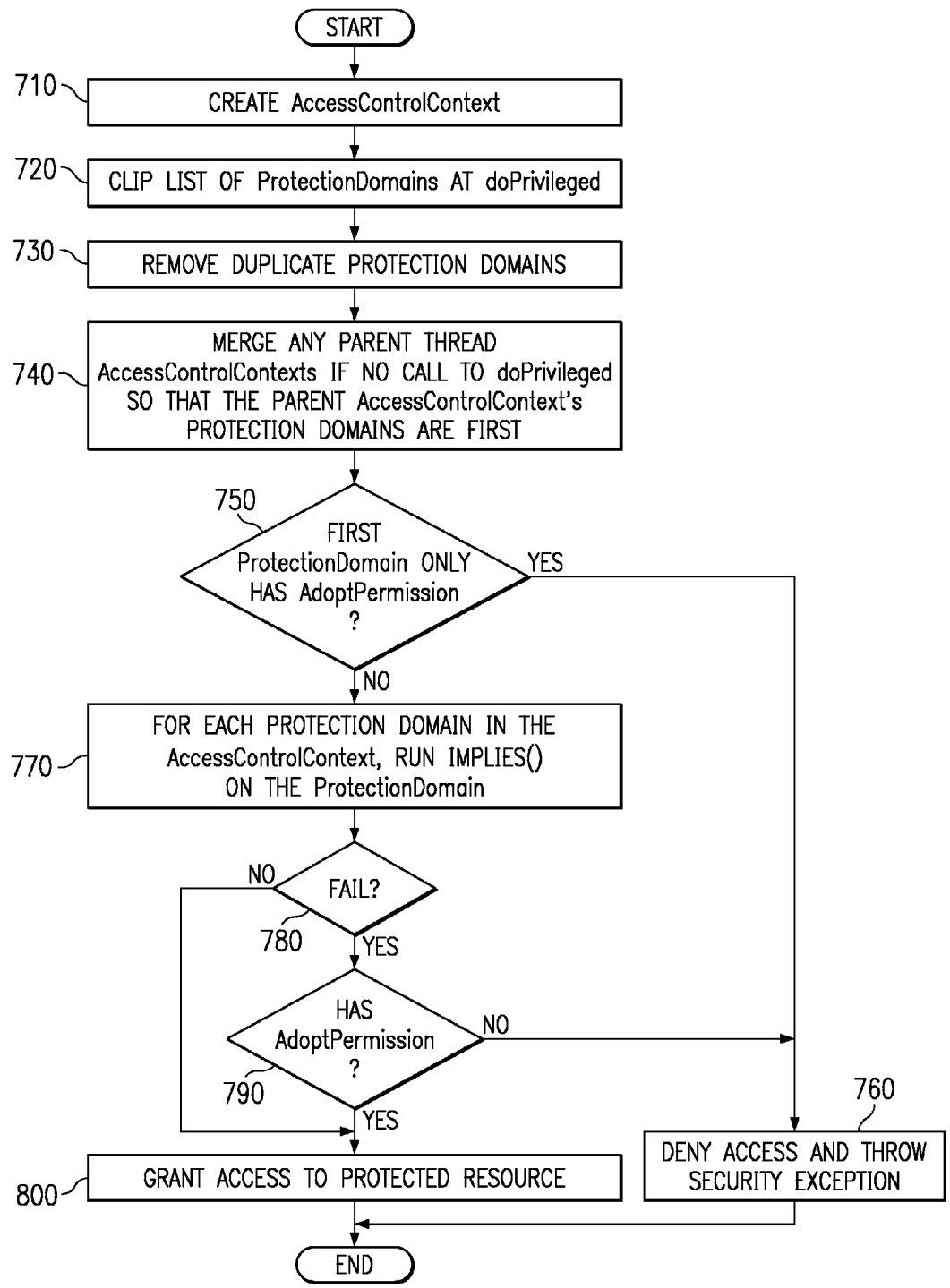
FIG. 7 is a flowchart outlining an exemplary operation of the present invention.

In contrast to the prior art authorization mechanism described above, an authorization mechanism of the present invention is shown in FIG. 7. The steps 710-730 are similar to step 610-630 and thus, a description of these steps is not included here. For each ProtectionDomain in the AccessControlContext, the implies( ) method is run on the ProtectionDomain to determine if it implies the required Permission (step 770).

A determination is made as to whether any of the checks using implies( ) indicates that the ProtectionDomain does not imply the required Permission (step 780). If so, a determination is made as to whether that ProtectionDomain includes the AdoptPermission Permission type (step 790). If not, the access attempt is denied and a SecurityException is thrown (step 760). Otherwise, if none of the ProtectionDomains fails the implies( ) check or if those that fail have the AdoptPermission Permission type, access to the protected resource is granted (step 800) and the operation ends as long as at least one of the ProtectionDomains in the AccessControlContext explicitly implied the required Permission and did not rely on the AdoptPermission to pass the authorization test.

Thus, the present invention provides a mechanism that allows for the adopting of Permissions from other ProtectionDomains in a secured manner. The present invention eliminates the security risks generated by using the AllPermission Permission type by providing a mechanism for granting Permissions without known a priori what these Permissions may be.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product stored in a computer readable, recordable-type medium and operable by a data processing system for controlling access to a protected resource, the computer program product comprising:
   first instructions for identifying a list of ProtectionDomains having one or more ProtectionDomains for a thread stack;
   second instructions for determining if each of the one or more ProtectionDomains implies a required Permission or has an AdoptPermission Permission type; and
   third instructions for granting access to the protected resource if at least one ProtectionDomain in the list of ProtectionDomains implies the required Permission and each other ProtectionDomain in the list of ProtectionDomains either implies the required Permission or has the AdoptPermission Permission type, wherein the AdoptPermission type permits a method call to adopt a required Permission without providing the method call with all Permissions and wherein at least one ProtectionDomain in the list of ProtectionDomains has the AdoptPermission Permission type.

2. The computer program product of claim 1, further comprising fourth instructions for denying access to the protected resource if none of the one or more ProtectionDomains implies the required Permission, access to the protected resource is denied.

3. The computer program product of claim 1, wherein the list of ProtectionDomains is an AccessControlContext.

4. The computer program product of claim 1, wherein the second instructions for determining if each of the one or more ProtectionDomains implies the required Permission include instructions for calling an implies( )method on each ProtectionDomain in the list of ProtectionDomains.

5. The computer program product of claim 1, wherein the method call is a callback method.

6. The computer program product of claim 1, wherein the list of ProtectionDomains is a list of the ProtectionDomains associated with the thread stack clipped at an AccessController.doPrivileged( )method call.

7. The computer program product of claim 1, wherein the list of ProtectionDomains is a merged list of ProtectionDomains that is generated by merging an inherited AccessControlContext with a current AccessControlContext.

8. The computer program product of claim 1, wherein the second instructions for determining if each of the one or more ProtectionDomains implies a required Permission or has an AdoptPermission Permission type include:
instructions for determining, for each ProtectionDomain in the one or more ProtectionDomains, if the ProtectionDomain implies the required Permission; and
instructions for determining, for each ProtectionDomain in the one or more ProtectionDomains that does not imply the required Permission, if the ProtectionDomain includes the AdoptPermission Permission type.

9. The computer program product of claim 1, wherein the computer program product is part of a security manager of a Java virtual machine.

10. An apparatus for controlling access to a protected resource, comprising:
a data processor coupled to a memory and operable for executing instructions in the memory to perform steps of:
identifying a list of ProtectionDomains having one or more ProtectionDomains for a thread stack;
determining if each of the one or more ProtectionDomains implies a required Permission or has an AdoptPermission Permission type; and
granting access to the protected resource if at least one ProtectionDomain in the list of ProtectionDomains implies the required Permission and each other ProtectionDomain in the list of ProtectionDomains either implies the required Permission or has the AdoptPermission Permission type, wherein the AdoptPermission type permits a method call to adopt a required Permission without providing the method call with all Permissions and wherein at least one ProtectionDomain in the list of ProtectionDomains has the AdoptPermission Permission type.

11. The apparatus of claim 10, further comprising denying access to the protected resource if none of the one or more ProtectionDomains implies the required Permission, access to the protected resource is denied.

12. The apparatus of claim 10, wherein the method call is a callback method.

13. The apparatus of claim 10, wherein the determining if each of the one or more ProtectionDomains implies a required Permission or has an AdoptPermission Permission type includes:
determining, for each ProtectionDomain in the one or more ProtectionDomains, if the ProtectionDomain implies the required Permission; and
determining, for each ProtectionDomain in the one or more ProtectionDomains that does not imply the required Permission, if the ProtectionDomain includes the AdoptPermission Permission type.

* * * * *